United States Patent [19]
Akiyama et al.

[11] Patent Number: 6,082,882
[45] Date of Patent: Jul. 4, 2000

[54] ADJUSTMENT MECHANISM FOR A HEADLAMP

[75] Inventors: Yoshiaki Akiyama; Masaki Takase; Toshikazu Iizuka, all of Tokyo, Japan

[73] Assignee: Stanley Electric Co., LTD, Japan

[21] Appl. No.: 09/206,493

[22] Filed: Dec. 7, 1998

[30] Foreign Application Priority Data

Dec. 8, 1997 [JP] Japan ................................ 9-337326

[51] Int. Cl.$^7$ .................................................. B60Q 1/06
[52] U.S. Cl. ........................... 362/524; 362/523; 362/424; 362/273; 362/289
[58] Field of Search ................................. 362/459, 487, 362/506, 507, 524, 529, 368, 429, 449, 273, 289, 324, 530, 424; 206/538, 539, 533, 807; 70/158, 163–168, 112, 190, 333 R–333 A, 448–450

[56] References Cited

U.S. PATENT DOCUMENTS 2,774,466  12/1956  Liska ........................................ 206/538
5,647,659   7/1997  Mori ........................................ 362/524

*Primary Examiner*—Sandra O'Shea
*Assistant Examiner*—Ismael Negron
*Attorney, Agent, or Firm*—Ostrolenk, Faber, Gerb & Soffen, LLP

[57] ABSTRACT

An adjustment prevention mechanism includes a fixing member provided to a part of a headlamp, and a moving member which is movable to an adjustment position and a shipping position relative to the fixing member and covers the adjusting member. The fixing member includes a tool guide, a moving member guide and a stopper. The moving member has a tool insertion hole which permits a tool to reach the adjusting element in accordance with the tool guide in the fixing member when the moving member is in the adjustment position, and prevents the tool from reaching the adjusting element when the moving member is in the shipping position. This adjustment prevention mechanism is attachable to the headlamp prior to mount the headlamp on an automobile.

6 Claims, 2 Drawing Sheets

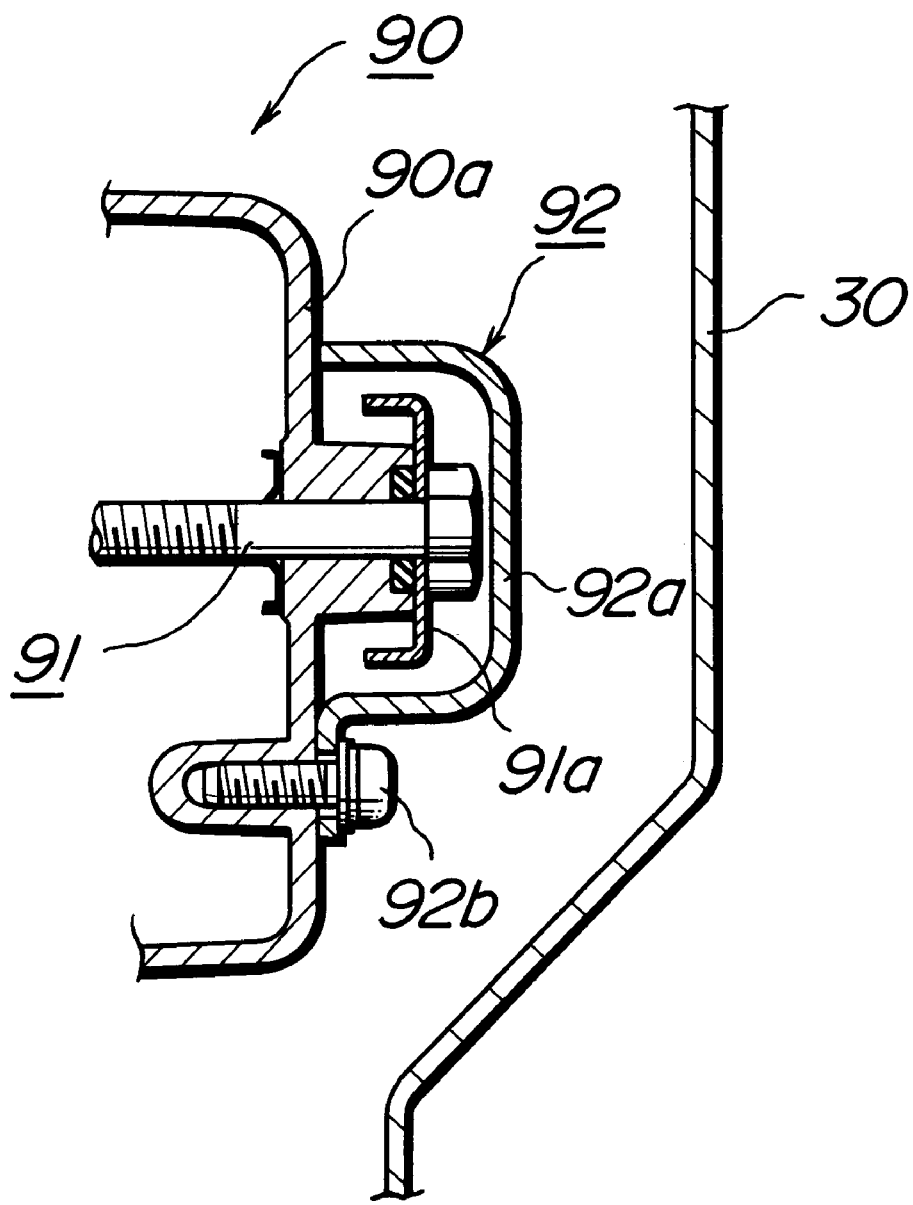

ADJUSTMENT MECHANISM FOR A HEADLAMP

BACKGROUND OF THE INVENTION

1. Field of the Invention

The present invention relates to a headlamp, and more particularly to a headlamp comprising an aiming adjustment device which is provided with an adjustment prevention mechanism to prevent any change of the aiming adjustment of the headlamp completed during a manufacturing process after shipment from the manufacturer.

2. Background Art

FIG. 3 shows a conventional headlamp 90. Since a manufacturing error is inevitable on the headlamp 90 and an automotive body 30 after the headlamp 90 is manufactured, some adjustments are required after the headlamp 90 is mounted on the automotive body 30 so that a specified beam direction should be obtained.

Accordingly, the headlamp 90 is equipped with an aiming adjustment device 91 that, for example, enables a reflector to be adjusted vertically and horizontally. An adjusting element 91a of said aiming adjustment device 91 is for example extended from an external surface of a housing 90a of the headlamp 90 for an adjustment purpose after the headlamp 90 is mounted on the automotive vehicle. Thus, the headlamp 90 can be easily adjusted from the outside after the headlamp 90 is mounted on the automotive vehicle.

However, if the adjusting element 91a is extended to the external surface of the housing 90a and is exposed as mentioned above, even a user of the automotive vehicle is capable of adjustment, leaving possibilities of improper adjustment by users who do not have the full and accurate knowledge about aiming. Depending on destination countries, the standard specifies provision of the adjustment prevention mechanism 92 to prevent users from manipulating the adjusting element 91a.

The conventional adjustment prevention mechanism 92 consists of a cover 92a for covering said adjusting element 91a and a mounting screw 92b (or a rivet depending on cases) for fixing the cover 92a on the housing 90a. After completion of the aiming adjustment, the manufacturer mounts the cover 92a with the mounting screw 92b to prevent any adjustment thereafter.

When the headlamp 90 is mounted on an actual automotive body 30, however, almost no gap is left between the housing 90a and the automotive body 30 in most cases as shown in FIG. 3. After completion of the aiming adjustment, there hardly remains a workspace for mounting said cover 92a of the adjustment prevention mechanism 92 and fixing the mounting screw 92b. Thus, this work is very hard to perform and takes a great deal of time, therefore raises problems such as decreased productivity and high cost.

SUMMARY OF THE INVENTION

To solve the conventional problems described above, an object of the present invention is to provide a head lamp, in which an adjustment prevention mechanism can be assembled to the aiming adjusting element in the head lamp prior to mount the head lamp on an automobile. Thereby, the problems such as a difficulty with adjustment work due to limited workspace and the like are solved, which cause in the conventional attachment work, and it is greatly effective to increase the productivity and lower the cost.

An aspect of the present invention is to provide a headlamp comprising an aiming adjustment device having an adjusting element, and an adjustment prevention mechanism for preventing any aiming adjustment by unauthorized workers, the adjustment prevention mechanism comprising a fixing member, and a moving member for covering the adjusting element, the moving member being movable to an adjusting position and a shipping position relative to the fixing member, the fixing member comprising a tool guide for assigning a predetermined position to a tool, a moving member guide provided along the movement direction of the moving member, and a stopper for maintaining the moving member in the shipping position at least when the moving member is moved to the shipping position, wherein the moving member has a tool insertion hole which permits a tool to reach said adjusting element in accordance with the tool guide of the fixing member which matches the hole when the moving member is in the adjustment position, and prevents the tool from reaching the adjusting element by disagreement of the tool guide with the hole when the moving member is in the shipping position.

Thereby, the adjustment prevention mechanism can be assembled to the head lamp prior to perform the aiming adjustment, and it become impossible for unauthorized workers to operate the aiming adjustment device by the adjustment prevention mechanism after aiming adjustment work.

Further, another aspect of the present invention is to provide a head lamp, wherein the fixing member is provided in a part of a head lamp assembly.

By this structure, the adjustment prevention mechanism can be assembled to the head lamp prior to perform the aiming adjustment, although the conventional adjustment prevention mechanism can not do so, in spite of the same simple mechanism and the same number of the parts as the conventional one.

A further aspect of the present invention is to provide a head lamp, wherein the moving member has an engagement means for holding the movement of the moving member by engaging with the stopper of the fixing member.

By this structure, the adjustment prevention mechanism action is securely retained and it become impossible for unauthorized workers to operate the aiming adjustment device by the adjustment prevention mechanism after aiming adjustment work.

A still further aspect of the present invention is to provide a head lamp, wherein the fixing member is provided with a restricting means for restricting the movement of the moving member.

By this structure, the adjustment prevention mechanism can securely separate aiming adjustment enabling position and disabling position.

BRIEF DESCRIPTION OF THE DRAWINGS

These and other objects and advantages of the present invention will become clear from the following description with reference to the accompanying drawings, wherein:

FIG. 3 is a cross-sectional view of a main part of a conventional adjustment prevention mechanism.

DETAILED DESCRIPTION OF THE PREFERRED EMBODIMENTS

The present invention is described in detail hereinafter with reference to embodiments shown in the accompanying drawings.

Figure 1:
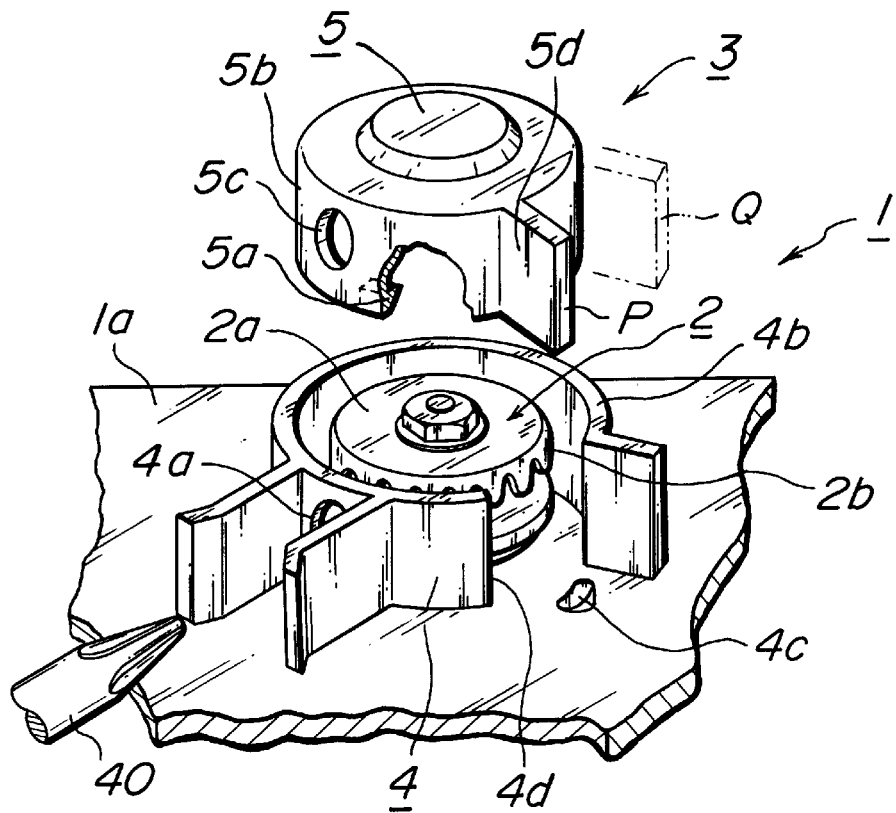
FIG. 1 is a perspective view of one embodiment of a head lamp in accordance with the present invention, a main part partially being exploded.

Referring to FIG. 1, reference numeral 1 denotes a headlamp in accordance with the present invention, showing a main part thereof. An aiming adjustment device 2 is provided in the headlamp 1. The headlamp is similar to a conventional headlamp in that an adjusting element 2a in the aiming adjustment device 2 is provided on an external surface of a housing 1a.

In addition, an adjustment prevention mechanism 3 is provided in the adjusting element 2a so that a user can not inadequately operate and adjust the adjusting element 2a. Here in the present invention, the adjustment prevention mechanism 3 comprises a fixing member 4 and a moving member 5. Thereby, it is possible to assemble the adjustment prevention mechanism 3 to the aiming adjustment device 2 prior to mount the headlamp 1 on an automobile.

In the present invention, the fixing member 4 is provided near a position where the adjusting element 2a is provided such as the external surface of the housing 1a and to a member which constructs the headlamp 1, which does not move in performing aiming adjustment. This fixing member 4 comprises a tool guide 4a which guides a tool 40 such as a driver used in aiming adjustment work and assigns a predetermined position to the tool 40 in performing aiming adjustment, a moving member guide 4b which guides the movement of the moving member 5 described hereinafter, and a stopper 4c which restricts the movement of the moving member 5 after performing aiming adjustment.

Further, the moving member 5 has a shape substantially similar to that of the conventional member in that it is formed in the shape of shallow closed-end cylinder (or cap-shaped) covering the adjusting element 2a. But in the present invention, a hook 5a such as, for example, an undercut with suitable structure, is provided in the moving member 5, and has a structure rotatably hooked to such as a ring-shaped flange provided in a member such as the housing 1a in which the element 2a is provided, so that the moving member 5 covers the adjusting element 2a. The moving member 5 may be hooked directly on the adjusting element 2a by using such as a gear 2b provided in the adjusting element 2a.

Further, a tool insertion hole 5c is provided on a side 5b of this moving member 5. Thereby aiming adjustment work can be performed by inserting the tool 40 into this tool insertion hole 5c, even when the moving member 5 has covered the adjusting element 2a. In addition, in this embodiment, a tab 5d radially extended from the contour of the cylindrical shape is provided in the moving member 5.

Further, the moving member guide 4b in the fixing member 4 is formed in the shape of substantially cylinder fitted to the outer circumference of the moving member 5. In addition, a notch 4d is provided, which corresponds to the tab 5d and have suitable angle. Thereby, the moving member 5 is rotatable in the extent of suitable range. In other words, an adjusting position P is set on one end in the rotation range, and a shipping position Q is set on the other end in the rotation range.

When the moving member 5 is set to the adjusting position P, the guide 4a of the fixing member 4 matches the tool insertion hole 5c of the moving member 5. When the moving member 5 is set to the shipping position Q, the tool guide 4a is covered with the side 5b of the moving member 5 because the guide 4a of the fixing member 4 shifts from the tool insertion hole 5c of the moving member 5, and can prevent the tool 40 from reaching the adjusting element 2a.

Further, for example, a stopper 4c such as a boss-shaped is provided in the fixing member 4. The tab 5d relatively become easy to go over the stopper 4c because the stopper 4c can be inclined path when the moving member 5 is rotated from the adjusting position P to the shipping position Q. On the other hand, the tab 5d substantially can not go over the stopper 4c when the moving member 5 is intended to rotate from the shipping position Q to the adjusting position P because the stopper 4c can be a difference in level.

The adjustment prevention mechanism 3 constructed as described above is assembled to the fixing member 4 so that the moving member 5 is positioned in the adjusting position P in the initial state, and the headlamp 1 is mounted on an automobile in this state. Therefore, in the production line of the automobile, the aiming adjustment work can be performed because the guide 4a of the fixing member 4 matches the tool insertion hole 5c of the moving member 5.

After the aiming adjustment work described above is completed, the moving member 5 is rotated from the adjusting position P to the shipping position Q by an operator pushing the tab 5d with the tool 40 or the like. This rotation permits the moving member 5 to be fixed to the shipping position Q by the stopper 4c. Therefore, if the automobile is shipped in the market in this state, users of the automobile can not touch the adjusting element 2a even though they intend to perform the aiming adjustment, thereby preventing the aiming inadequately altering. In addition, an adhesive as well as the stopper 4c may be used to fix the moving member 5 to the shipping position Q so that the action and the effect are further ensured.

Figure 2:
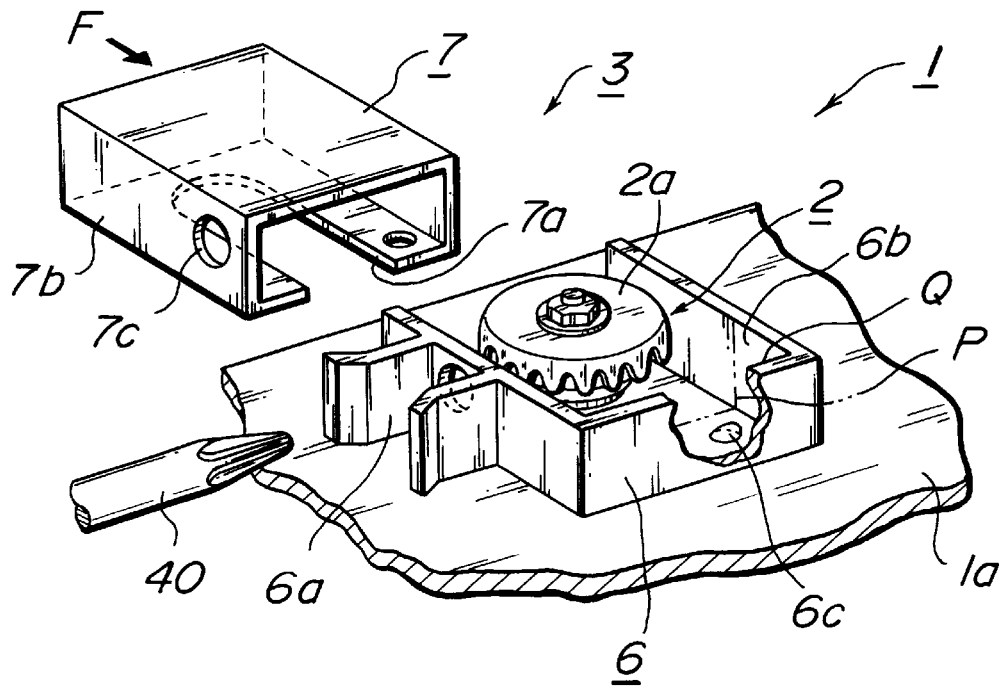
FIG. 2 is a perspective view of another embodiment of a head lamp in accordance with the present invention, a main part partially being exploded.

FIG. 2 shows another embodiment of the present invention. Although, in the previous embodiment, the moving member 5 is formed to be substantially closed-end cylinder-shaped and rotate, in this embodiment, a moving member 7 is constructed to be substantially box-shaped and move on the straight. A tool insertion hole 7c is provided on a side 7b parallel to the direction of movement.

Further, a hook 7a is provided on the bottom of the moving member 7, which is in the shape of substantially U-shaped groove suitable to move the moving member 7 on the straight, and the moving member 7 is hooked on suitable position, such as on the housing 1a. The moving member 7 is similar to the moving member 5 in that the moving member 7 covers the adjusting element 2a of the aiming adjustment device 2 in hooked state.

On the other hand, a moving member guide 6b is provided, which is substantially U-shaped assigning an adjusting position P and a shipping position Q corresponding to movement of the moving member 7. Further a tool guide 6a is provided corresponding to the adjusting position P, in a fixing member 6. Furthermore, a stopper 6c is also provided in order to restrict the movement of the moving member 7 after adjusting element.

In this embodiment, the adjustment prevention mechanism 3 is also assembled to the fixing member 6 so that the moving member 3 is positioned in the adjusting position P in the initial state. After aiming adjusting work is completed in the production line, the moving member 7 moves to the shipping position Q, hereafter preventing the tool 40 from reaching the adjusting element 2a. Further, because in the embodiment, the moving member 7 is substantially box-shaped and moves on the straight, the moving member 7 may be only pushed perpendicular to the movement direction of the moving member 7 using the tool 40 or the like in moving the moving member 7 shown in an arrow F of the FIG. 2, and any notch and tab provided in the previous embodiment are not necessary.

Further, adjusting the length of the fixing member 6 corresponding to the moving member 7 and the length of the movement direction of the moving member 7 can restrict the movement of the moving member 7. Moreover, when a hole provided in the moving member 7 is engaged with the stopper 6c of the fixing member 6, the moving member 7 can be maintained in the position even after adjusting element.

As described above, in accordance with the present invention, the adjustment prevention mechanism is attachable to the headlamp prior to mount the headlamp on an automobile, therefore, the problems such as a difficulty with adjustment work due to limited workspace and the like are solved, which cause in the conventional attachment work, and it is greatly effective to increase the productivity and lower the cost.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An adjustment prevention mechanism for a headlamp for preventing any aiming adjustment by unauthorized workers, said adjustment prevention mechanism comprising:

a fixing member; and a moving member for covering an adjusting element, said moving member being movable to an adjusting position and a shipping position relative to said fixing member, said fixing member comprising a tool guide for assigning a predetermined position to a tool, a moving member guide provided along the movement direction of said moving member, and a stopper for maintaining said moving member in said shipping position at least when said moving member is moved to said shipping position;

wherein said moving member has a tool insertion hole which permits a tool to reach said adjusting element in accordance with said tool guide of said fixing member which matches the hole when said moving member is in said adjustment position, and prevents said tool from reaching said adjusting element by disagreement of the tool guide with the hole when said moving member is in said shipping position.

2. An adjustment prevention mechanism according to claim 1, wherein said moving member has an engagement means for holding the movement of the moving member by engaging with said stopper of said fixing member.

3. An adjustment prevention mechanism according to claim 1, wherein said fixing member is provided with a restricting means for restricting the movement of said moving member.

4. An adjustment prevention mechanism according to claim 1, wherein said fixing member is provided in a part of a headlamp assembly.

5. An adjustment prevention mechanism according to claim 2, wherein said moving member has an engagement means for holding the movement of the moving member by engaging with said stopper of said fixing member.

6. An adjustment prevention mechanism according to claim 2, wherein said fixing member is provided with a restricting means for restricting the movement of said moving member.

* * * * *